US009511900B2

(12) United States Patent
Laufer et al.

(10) Patent No.: US 9,511,900 B2
(45) Date of Patent: Dec. 6, 2016

(54) SELF-STABILIZING PARTITION WALL WITH ENHANCED THERMAL INSULATION FOR NEGATIVE-PRESSURE TANKS

(75) Inventors: Andrej Laufer, Berlin (DE); Jan Sonnenberg, Berlin (DE); Soeren Paulussen, Berlin (DE); Niels Braunschweig, Berlin (DE)

(73) Assignee: INVENSOR GMBH, Berlin (DE)

( * ) Notice: Subject to any disclaimer, the term of this patent is extended or adjusted under 35 U.S.C. 154(b) by 1067 days.

(21) Appl. No.: 13/696,077

(22) PCT Filed: May 5, 2011

(86) PCT No.: PCT/DE2011/075099
§ 371 (c)(1),
(2), (4) Date: Feb. 15, 2013

(87) PCT Pub. No.: WO2012/000494
PCT Pub. Date: Jan. 5, 2012

(65) Prior Publication Data
US 2013/0133360 A1 May 30, 2013

(30) Foreign Application Priority Data
May 5, 2010 (DE) .................. 10 2010 019 907

(51) Int. Cl.
F25B 15/00 (2006.01)
B65D 25/04 (2006.01)
F25B 17/08 (2006.01)
F25B 35/04 (2006.01)

(52) U.S. Cl.
CPC ............... *B65D 25/04* (2013.01); *F25B 15/00* (2013.01); *F25B 17/08* (2013.01); *F25B 35/04* (2013.01); *Y02B 30/62* (2013.01); *Y02B 30/64* (2013.01); *Y10T 29/49826* (2015.01)

(58) Field of Classification Search
CPC ........... F25B 15/00; F25B 17/08; F25B 35/04; Y02B 30/64; Y02B 30/62; B65D 25/04
USPC .............................................. 220/530; 62/476
See application file for complete search history.

(56) References Cited

U.S. PATENT DOCUMENTS

| 3,275,418 | A | * | 9/1966 | Nee | .................. B64D 37/02 |
| | | | | | 220/530 |
| 3,480,200 | A | | 11/1969 | Rohrer | |
| 4,281,271 | A | * | 7/1981 | Young | .................. H01J 61/30 |
| | | | | | 313/493 |
| 6,378,326 | B2 | | 4/2002 | Maier-Laxhuber et al. | |
| 7,383,964 | B2 | | 6/2008 | Keller | |
| 8,099,969 | B2 | | 1/2012 | Henning et al. | |
| 2010/0293989 | A1 | | 11/2010 | Buttner et al. | |
| 2011/0314850 | A1 | | 12/2011 | Braunschweig et al. | |

FOREIGN PATENT DOCUMENTS

DE          28 55 608 A1    6/1980
DE    10 2004 053436 A1    5/2006
(Continued)

*Primary Examiner* — Stephen Castellano
(74) *Attorney, Agent, or Firm* — Joyce von Natzmer; Agris & von Natzmer LLP

(57) ABSTRACT

The invention describes a negative-pressure tank having a partition, the partition including at least two walls, and the negative-pressure tank including at least two chambers, and a free space being present in the partition in which an ambient pressure prevails. The invention further describes a sorption machine having a negative-pressure tank.

15 Claims, 5 Drawing Sheets

(56) References Cited

FOREIGN PATENT DOCUMENTS

Figure 1:
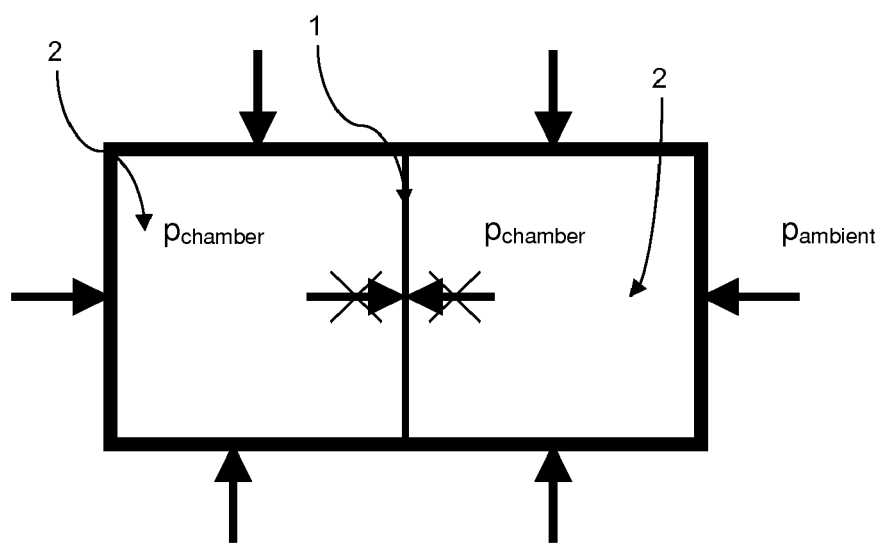

| | | |
|---|---|---|
| DE | 10 2007 012113 A1 | 9/2008 |
| EP | 1 143 210 A1 | 10/2001 |
| EP | 1 507 125 A2 | 2/2005 |
| EP | 1 645 819 A1 | 4/2006 |
| JP | 03-199861 A | 8/1991 |
| WO | 2010/000256 A2 | 1/2010 |

* cited by examiner

Fig. 3
A   Before the evacuation
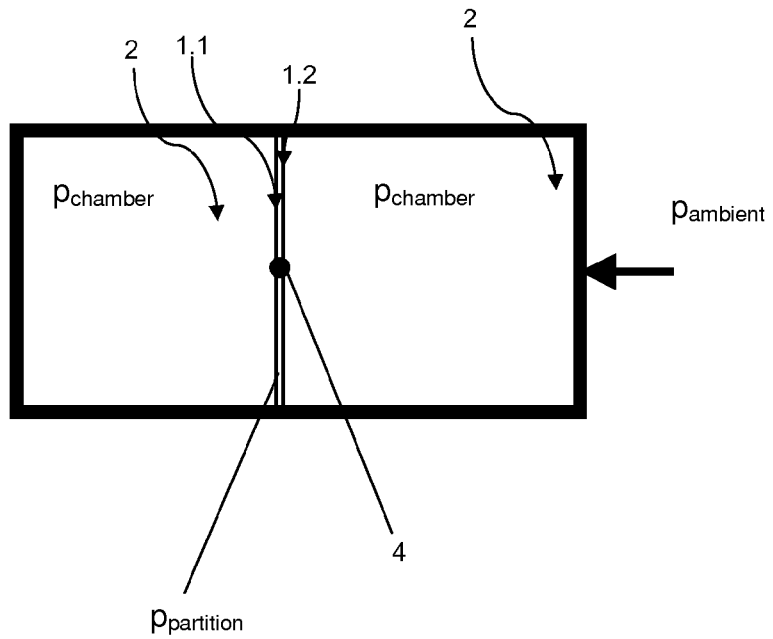
where $p_{chamber} = p_{partition} = p_{ambient}$
B   After the evacuation
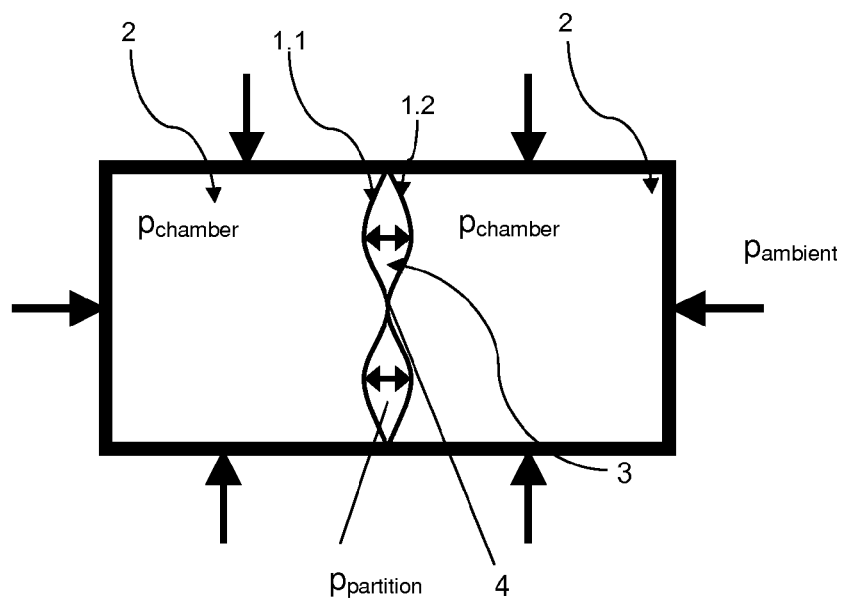
where $= p_{partition} > p_{chamber}$ where $p_{desorber} \geq p_{condenser} > p_{evaporator} \geq p_{adsorber}$ where $p_{ambient} \gg p_{desorber} \geq p_{condenser} > p_{evaporator} \geq p_{adsorber}$

SELF-STABILIZING PARTITION WALL WITH ENHANCED THERMAL INSULATION FOR NEGATIVE-PRESSURE TANKS

This is the U.S. national stage of International application PCT/DE2011/075099, filed May 5, 2011 designating the United States and claims priority to German application DE 10 2010 019 907.9, filed May 5, 2010.

The invention relates to a negative-pressure tank having a partition, the partition including at least two walls, and the negative-pressure tank including at least two chambers, and a free space being present in the partition in which an ambient pressure prevails. The invention further relates to a sorption machine having a negative-pressure tank.

In the prior art, refrigerating machines are described which are generally used for heating and/or cooling buildings. Refrigerating machines implement thermodynamic cyclic processes in which, for example, heat is taken in below ambient temperature and released at a higher temperature. The thermodynamic cyclic processes resemble those of a heat pump. Examples of refrigerating machines known in the prior art include adsorption refrigerating units, diffusion-absorption refrigerating machines, adsorption refrigerating units, and solid sorption heat pumps, as well as compression refrigerating units.

The adsorption refrigerating machine is composed of at least one adsorber/desorber unit, an evaporator, a condenser, and/or a combined evaporator/condenser unit which are housed in the same tank or in separate tanks, in which case the tanks are connected to one another via tubes or the like for the refrigerant flow. The advantage of sorption machines over conventional heat pump technology is that the adsorption/desorption process occurs solely via temperature control of the sorbent. The tank of the adsorption machine may thus be hermetically sealed in a gas-tight manner. When water, for example, is used as refrigerant, the adsorption refrigerating machine preferably operates in the negative pressure range.

The adsorption which takes place in an adsorption machine describes a physical process in which a gaseous refrigerant (water, for example) accumulates on a solid. The desorption of the refrigerant, i.e., the release of the refrigerant from the solid, in turn requires energy. In an adsorption refrigerating machine, the refrigerant, which takes in heat at low temperature and low pressure and releases heat at higher temperature and higher pressure, is selected in such a way that the adsorption or desorption is accompanied by a change in the state of aggregation. Materials which are finely porous and which therefore have a very large internal surface are described in the prior art as adsorbents. Advantageous materials are active carbon, zeolites, alumina or silica gel, aluminum phosphates, silica-aluminum phosphates, metal silica-aluminum phosphates, mesostructure silicates, organometallic structures, and/or microporous material, including microporous polymers.

In the process of the adsorption machine, the heat of adsorption and the heat of condensation must be discharged from the unit. This generally occurs via a flowing heat transfer medium which transports this heat to a heat sink, for example to a recooling plant, which releases the heat to the ambient air. However, if the heat of adsorption and/or the heat of condensation is/are not discharged or is/are not satisfactorily discharged, the temperatures, and thus the pressures, inside the adsorption machine would rise, and the adsorption process would come to a standstill. The efficiency of an adsorption machine may thus be significantly increased by improved heat transfer, which necessarily also improves the cost-effectiveness of the unit.

The evaporation in sorption machines generally requires a vacuum tank, since water, for example, may be used as refrigerant, and therefore low pressures are necessary. The known classical vacuum tanks have a main body which is usually cylindrical, and which is formed, among other things, by a shell made of metal having a thickness of at least 4 or 5 mm. These types of vacuum tanks are very heavy compared to other parts of sorption machines. The interior components in these vacuum tanks often have a rectangular shape. For these reasons, effective use is often not made of the space provided by the vacuum tank. This is disadvantageous not only for the power density and the material costs, but also for the thermal mass.

Pressure tanks are described in the prior art whose internal pressure is above or below ambient pressure. To withstand the pressures that occur, the tanks have thick walls, for example, which are also associated with a high base weight. In addition, the manufacturing costs for the pressure tanks are high due to the dimensions of the tank and the material costs. When the pressure tank is used in a sorption machine, the tank must also be thermally insulated. This requires a separate, additional level of effort (for example, insulating elements made of insulating material).

In particular for sorption machines having multiple chambers, in which various temperatures and corresponding different pressures are present in the individual chambers, insufficient thermal insulation between the chambers results in undesirable heat exchange between the chambers. This reduces the efficiency of such machines. In addition, a heavy structural design of the partition between the chambers likewise results in a drop in efficiency, since the walls act as an additional, but undesired, thermal mass, and thus reduce the efficiency of the machines. Furthermore, heavy designs of the partitions are of course an undesired additional weight.

Accordingly, the object of the invention is to provide a tank which does not have the disadvantages and deficiencies of the prior art, which has a low weight, withstands pressures that occur, has improved thermal insulation between the chambers, and represents reduced thermal masses for the adsorption processes.

The object is achieved by the features of the independent claims. Advantageous embodiments result from the subclaims.

A negative-pressure tank having at least one partition is provided, the partition including at least two walls, and the negative-pressure tank including at least two chambers, wherein the partition separates the chambers, the two walls of the partition are connected to one another, and at least one free space is present in the partition. The negative-pressure tank according to the invention does not have the disadvantages and deficiencies of the prior art. Due to the surprising design of the partitions, a light but pressure-resistant negative-pressure tank is provided. In addition, the tank requires less maintenance than the tanks disclosed in the prior art, since the partitions are inherently stable (self-stabilizing) and are not damaged by the pressure forces.

In addition, the tank has improved thermal insulation between the chambers. This, and the accordingly reduced thermal mass of the tank, results in increased efficiency of the machine. The use of an additional insulating layer which, for example, may be applied to a partition, may thus be dispensed with. The insulating layers may be damaged by the high temperatures and pressures, so that frequent maintenance intervals are necessary. When damage occurs, the entire negative-pressure tank must be replaced, which in turn involves a large expenditure of effort and high costs. In the case of the negative-pressure tank according to the invention this is not necessary, since additional insulating layers may be dispensed with entirely. One or more partitions may be present in the negative-pressure tank, and one or more chambers may be integrated into the negative-pressure tank.

The partition may preferably be used to separate at least two chambers of a negative-pressure tank, the partition including at least two walls which are connected to one another at at least one point, at least two free spaces being present in the partition. The partition forms a mechanical structure which results from a connection of the two walls of the partition at at least one point, the two walls of the partition enclosing at least two free spaces. The free spaces preferably result from the connection of the two walls at at least one point. The free spaces are preferably hermetically sealed with respect to the chambers, a gas mixture, preferably air, preferably being present in the free spaces, and an ambient pressure prevailing. The ambient pressure is preferably higher than the pressure that is present in the chambers. However, it may also be preferred that the ambient pressure in the free spaces is the same as that in the chambers. Light, stable tanks may thus be provided.

The partition is embodied by a mechanical structure which has a higher interior pressure level than the negative-pressure chambers themselves. The partition has two walls which are partially connected, so that a free space is present in the partition. Within the meaning of the invention, a free space in particular is a space that results from two lateral surfaces or walls of a partition being connected to one another. That is, the free space is present between the walls of the partition. No components or other devices are situated in the free space (also see FIG. 3, free space (reference numeral 3)).

An ambient pressure, i.e., an atmospheric pressure, is preferably present in the free space. One skilled in the art is aware that the atmospheric pressure varies as a function of temperature, elevation, and location. Means are available to one skilled in the art which allow pressure measurement, so that it may be easily determined that a pressure is present in the partition which is different from that in the chambers. A pressure in the partition is preferably significantly higher than that in at least one chamber. Thus, the pressure in the free spaces in the partition is preferably greater than or equal to the pressure that is present in the chambers. The chambers may have different pressures, which are preferably different from the pressure that is present in the partition or free space. As the result of applying a pressure, in particular a negative pressure, the partition experiences a deformation, so that the volume of the free space increases. Due to the negative pressure in the chambers a very rigid structure is formed in the partition, which in addition results in very good thermal insulation between the chambers (the insulating effect from stationary gas, for example air, results in no heat conduction or convection). The pressure of the partition preferably corresponds to ambient pressure.

For one skilled in the art, the wording "essentially" does not represent ambiguous wording with respect to the pressure, since he recognizes from the overall disclosure of the teaching according to the invention that the pressure in the free spaces of the partition is preferably different from that in the chambers, and this wording naturally encompasses small and large pressure differences alike. The differing pressures are determinable, for example, using measuring methods described in the prior art.

In one preferred embodiment, a fluid is present in the free space. Within the meaning of the invention, a fluid refers in particular to a gas or a liquid. It is preferred that air is present in the free space. Within the meaning of the invention, air refers in particular to the gas mixture of the earth's atmosphere. Dry air contains nitrogen, oxygen, argon, carbon dioxide, hydrogen, and other trace gases. It has surprisingly been shown that the negative-pressure tank has fewer natural oscillations, and therefore requires less maintenance.

The walls of the partition are preferably designed as metal sheets. The teaching according to the invention allows thick sheets (thickness less than 3 mm) or also thin sheets to be used for constructing partitions. Thin sheets are sheets having a thickness of less than 2 mm, or preferably less than 1 mm. This preferably involves finished hot- or cold-rolled sheet metal, which is primarily used for forming purposes. Depending on the steel grade, these thin sheets may also be tin-plated, zinc-plated, copper-plated, nickel-plated, lacquered, enameled, or coated with a plastic surface coating. It has surprisingly been found that, in particular by use of sheet metal, a thin and therefore light partition or a negative-pressure tank having a low weight may be produced. This sheet metal is thus also usable in machines which previously were not suited for a negative-pressure tank, since the tanks disclosed in the prior art have excessive weight.

Within the meaning of the invention, "walls" refer in particular to two lateral surfaces of the partition which flatly abut one another.

The walls preferably have a thickness of less than 3 mm, particularly preferably less than 2 mm, and very particularly preferably less than 1 mm. This means in particular that the walls have a thickness of less than 0.8 mm, preferably less than 0.7 mm, and particularly preferably less than 0.6 mm (for example, less than 0.4 mm; 0.2 mm or less than 0.05 mm, or even less). Thin-walled partitions may thus be provided which are able to withstand high pressure forces despite a low weight. Partitions having such small wall thicknesses are particularly advantageous, since they are very light but are still able to withstand the mechanical stresses from the vacuum forces. The thickness may also relate to only a portion of the walls, so that the wall has areas of different thickness. It has been shown that by use of the preferred wall thicknesses, a negative-pressure tank may be provided which operates with lower noise.

The partition is preferably used to separate at least two chambers in a pressure tank, in particular a negative-pressure tank. One skilled in the art is aware that chambers in a pressure tank are hermetically separated from one another; i.e., the partition analogously represents a hermetic barrier which divides a space in the pressure tank into at least two chambers. A negative pressure, i.e., a pressure that is lower than ambient pressure, preferably prevails in the chambers. It was completely unexpected that a deformation of the partition could be produced by applying the negative pressure. The deformation may also be achieved, for example, by applying a positive pressure in the partition. It was completely unexpected that, using the wall thicknesses mentioned according to the invention, in particular having the preferred wall thicknesses, partitions for negative-pressure tanks may be provided which are deformed in a calculated manner under the forces of the vacuum and are still fully operational. The calculated deformation means that, although the partitions are implosion-resistant, they undergo distinct deformation under the action of negative pressure. A person with average skills in the art has heretofore assumed that these types of partitions cannot be used in negative-pressure tanks. These types of partitions have not been previously used for the mentioned application, since experts in the field presumed that they were unstable and unsafe. To the credit of the inventors, it has been demonstrated that even a clearly discernible deformation of the partitions under the action of pressure does not result in functional failures or other adverse effects for the negative-pressure tank according to the invention. The deformation results from the application of negative pressure, and may therefore be defined as a consequence of same.

The walls of the partition are preferably connected to one another in a positive-fit and/or an integrally joined manner. In this regard it may be advantageous to only partially connect the walls. Within the meaning of the invention, a partial connection refers in particular to a connection of the walls which is not present over the entire surface. Although the walls are joined together at their side edges, on their surface there is only at least a punctiform or linear connection. That is, a free space is preferably present between the side walls of the partition. Due to the preferred connection of the walls, the natural oscillation of the partitions may be significantly reduced, so that losses in functionality no longer occur.

It should be emphasized that the partition is not to be regarded as a multichamber system. There is only a partial connection between the walls, so that multiple chambers are not generated, but, rather, only a free space. The application of a negative pressure results in a deformation of the partition, so that the free space has different volumes before and after the application of the pressure.

Positive-fit connections preferably result from the interlocking of at least two connection partners. The positive-fit connections include screws, rivets, pins, or clamps. The walls of the partition may be connected by means of screws, for example, which connect the surfaces at specific points.

In addition, the walls may be connected via integrally joining means. Integrally joined connections are held together by atomic or molecular forces. At the same time, they are nondetachable connections which may be loosened only by destroying the components and/or the connection means. Integrally joined connections include soldering, welding, or gluing.

One skilled in the art is aware that positive-fit or integrally joined connections may be designed, for example, as weld joints in the form of one or more connecting points (a welding point, for example), or as a linear connection (a weld seam, for example) or a full-surface connection. These types of partitions are particularly light, but surprisingly still have good stability.

To allow a flow of a fluid, in particular steam, from one chamber into another chamber, it may be preferable for the partition to have at least one leadthrough or opening for a flow between the chambers. This may be, for example, a steam flap or steam valve. The vapor openings may advantageously be introduced into the partition at a welding point and allow the steam to flow through. Within the meaning of the invention, the term "flow" refers to an energy transfer and/or mass transfer which occur(s) in particular due to diffusion or convection. However, it may also be advantageous to integrate one or more vapor openings at another location in the partition. The vapor openings may be integrated into the partition in such a way that an optimum vapor exchange may occur between the chambers.

In another preferred embodiment, it may be provided that the joined metal sheets have a different material composition and/or different dimensioning, such as a different thickness. That is, the partitions may be composed of various metal sheets having different characteristics, whereby "characteristics" may mean different metal compositions, different dimensioning of the metal sheets, or a different surface treatment or some other type of chemical or physical treatment of the metal sheets and/or the reinforcing means. Partitions or negative-pressure tanks may thus be provided which are insensitive to high temperatures or pressures and have a longer service life.

The invention likewise relates to a sorption machine comprising a negative-pressure tank which includes at least one partition and at least two chambers, wherein the partition separates the chambers, and the two walls of the partition are preferably connected to one another at at least one point, wherein at least one free space is present in the partition, and an ambient pressure is present in the free space. The free space may thus also be referred to as an air chamber. The sorption machine is advantageously an adsorption machine, in particular an adsorption refrigerating machine. Within the meaning of the invention, "chambers" preferably describe adsorption chambers and desorption chambers, evaporation chambers, and condensation chambers. The partition is advantageously used as a separating wall between the chambers.

A person with average skills in the art has heretofore assumed that these types of negative-pressure tanks having such partitions cannot be used at all in sorption machines, in particular adsorption machines. These types of partitions have not been previously used for the mentioned application, since experts in the field presumed that they were unstable and unsafe. However, it has been found that even a clearly discernible deformation of the partitions under the action of pressure does not result in functional failures or other adverse effects for the negative-pressure tank according to the invention, in particular when used in an adsorption refrigerating machine. The deformation results from the application of negative pressure, and may therefore be defined as a consequence of same. A negative-pressure tank may be cost-effectively manufactured (in a mass production process) which is light, withstands high pressures, and is easily integratable as an essentially maintenance-free component into a sorption machine. The weight of a sorption machine may thus be substantially reduced, which in particular significantly improves the usability of the sorption machine.

The invention further relates to a sorption machine, comprising at least one adsorber-desorber unit having heat exchangers and sorption material, at least one condenser, at least one condenser-heat exchanger, at least one evaporator-condenser unit, and/or an evaporator-heat exchanger, at least a portion of these units being situated in a negative-pressure tank according to the invention, and the sorption machine having terminal and connection elements as well as pipe leadthroughs for hydraulic connections and operation. A person with average skills in the art is aware of which of the above-mentioned units are to be used, depending on the type of sorption machine. The above listing represents a group of units, of which individual units may be combined, depending on the type of sorption machine; the selection and combination of the individual components are known to one skilled in the art.

In one preferred embodiment of the sorption machine, the adsorber-desorber unit is present in the negative-pressure tank, the condenser-heat exchanger and the evaporator-heat exchanger being situated at a distance from one another, and the negative-pressure tank with the adsorber-desorber unit being provided in the space between same. The dividing surfaces of the negative-pressure tank facing the condenser-heat exchanger and the evaporator-heat exchanger, as well as the partition between the adsorber chamber and the desorber chamber, is/are provided with a partition of the type described above. It was completely unexpected that, as a result of the negative-pressure tank, the sorption machine according to the invention, in particular the adsorption refrigerating machine, does not have the above-mentioned disadvantages of the prior art.

The invention further relates to the use of the negative-pressure tank according to the invention for sorption machines, in particular adsorption refrigerating machines. In one particularly preferred embodiment of the invention, it is provided that units are situated in the negative-pressure tank according to the invention, whereby the units may be an adsorber-desorber unit, a condenser, an evaporator, a condenser-evaporator unit or an evaporator-condenser unit, an evaporator-heat exchanger, and/or an evaporator-condenser unit, for example.

One skilled in the art is aware that operating points may denote certain points in the characteristic map or on the characteristic curve of a technical device, preferably a sorption machine, particularly preferably an adsorption refrigerating machine or adsorption heat machine, which are included due to the system properties and acting external influences and parameters. Examples are the temperatures of the heat sinks, and sources or total volumetric flows in the return cooling circuit in the evaporator or the desorber train.

Within the meaning of the invention, the "operating method" preferably refers to the manner in which the machine is operated. An example of such is the adaptation of the cycle times of the sorption machine; i.e., the output of the machine may be increased by short cycle times, whereas longer cycle times result in a higher efficiency.

The installed components may refer, for example, to adsorber heat exchangers, which are provided with the same pressure but with different adsorption material. The adsorption material may advantageously be applied differently; i.e., pouring, bonding, and/or crystallization may be involved. As a result of these different types of application, the adsorption machine may be adapted to different requirements. Thus, the machine may be adapted to the location or to the refrigerant. In addition, the layer thickness of the adsorption material is crucial for the performance of the adsorption material.

Within the meaning of the invention, the system configuration preferably refers to the configuration of the machine, i.e., for example the internal hydraulic connection of the components of the machine, the internal refrigerant-side connection of the components, or the modified basic design of the machine (for example, the number of adsorbers, operation of the evaporator or of the condenser, etc.).

The negative-pressure tank may advantageously be used for one-chamber systems, or also for two- or multichamber systems, in each case with only one adsorber or multiple adsorbers of a sorption machine, for example an adsorption machine. In addition, adaptation may be easily and quickly made to other types of sorption machines. There is essentially no need to change the equipment of the machines for this purpose.

Advantages of the Invention

The structure forms by itself, and only due to the pressures which are present (operation- or process-related)
It represents a solution for mechanical and thermal problems
Due to the mutually compensating forces at the partition, this wall actually does not have to have a design that is resistant to negative pressure; only the pressure fluctuations and pressure differences between the chambers have to be taken into account in the design
Use is made of the "costless" ambient pressure forces (i.e., utilization of the vacuum forces which normally always represent a problem, and against which operation/design must consistently be directed)
There are no additional insulating elements
Simple design, installation, manufacture
Universally applicable (size, shape of wall, etc.)
There are no preceding process steps, such as edges of a reinforcement profile, impressing of beads
Very high stability
Very good thermal insulation
Reduced thermal mass of the partition
Does not have the disadvantages of the prior art.

Figure 2:
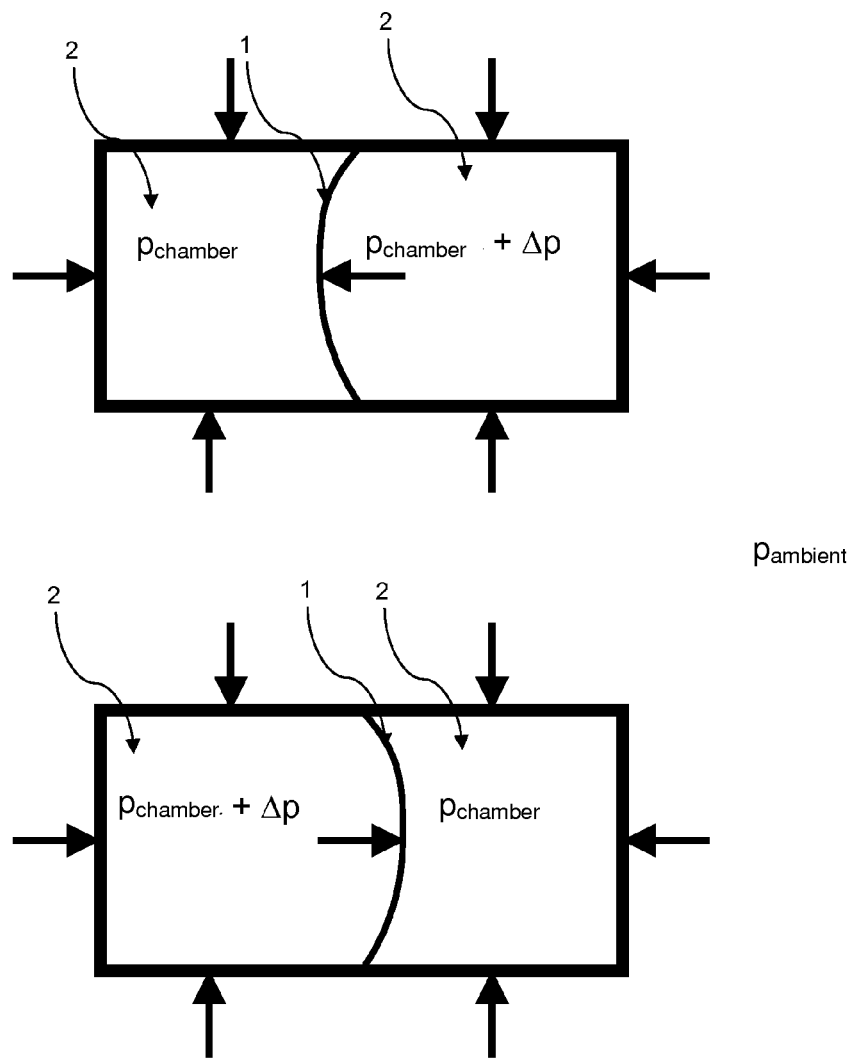
Figure 4:
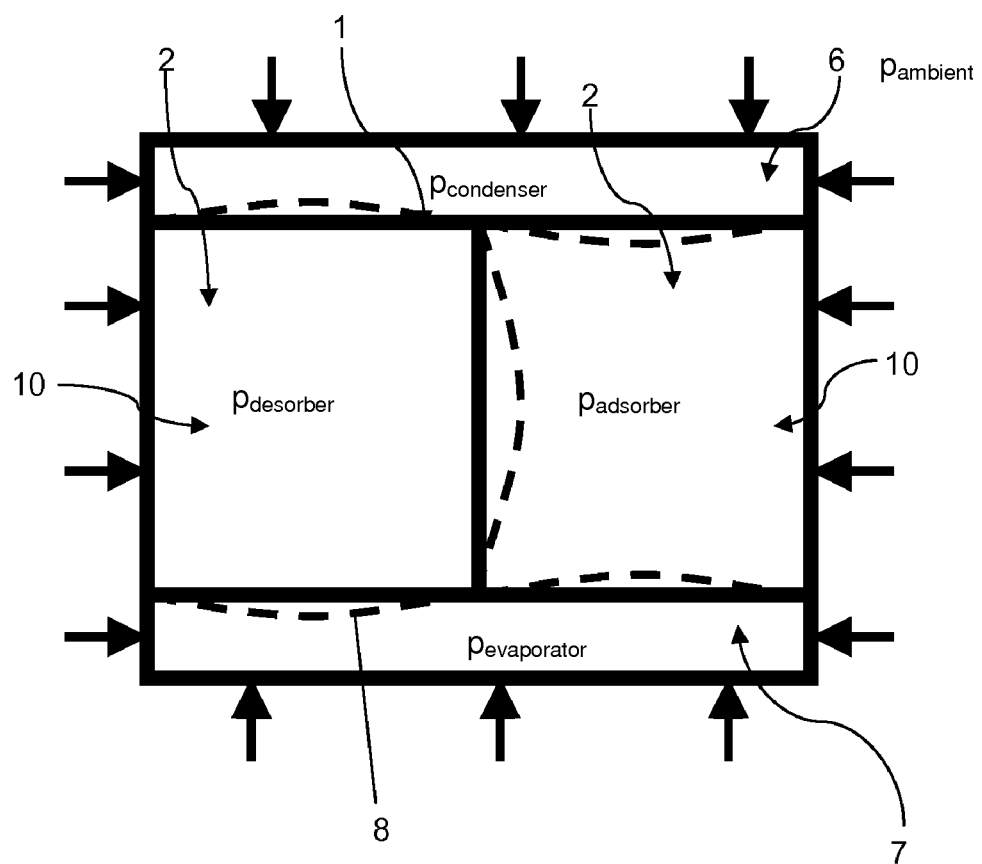
Figure 5:
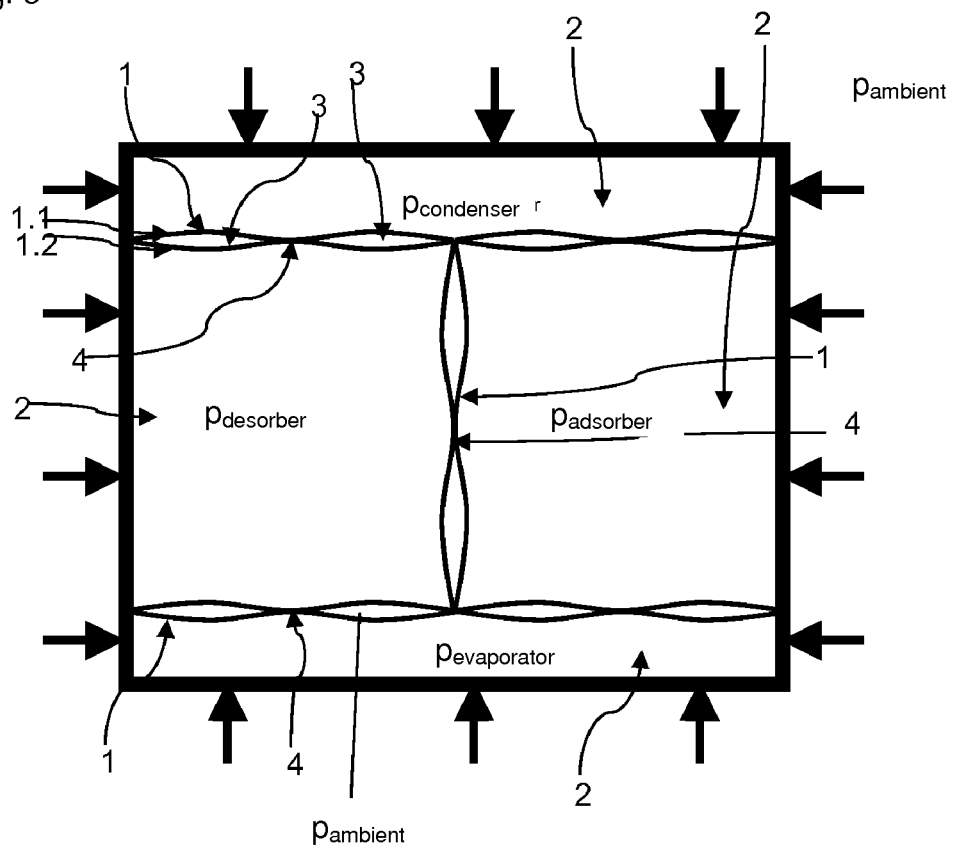

The invention is explained below with reference to figures by way of example, without being limited thereto. The figures show the following:

FIGS. 1 and 2 show variants of the prior art
FIGS. 3A and 3B show negative-pressure tanks before and after the evacuation
FIG. 4 shows a negative-pressure tank according to the prior art in a sorption machine
FIG. 5 shows a preferred negative-pressure tank in a sorption machine FIG. 1 and FIG. 2 show one variant of the prior art. A negative-pressure tank is illustrated which has two chambers 2 that are separated from one another by a separating wall 1. This wall 1, which is not to be referred to as a partition according to the invention, is generally not subjected to high pressure forces (indicated by black block arrows), since the forces compensate one another. If a higher pressure ($p_{chamber}+\Delta p$) is present in one of the chambers 2 than in the other chamber ($p_{chamber}$), this results in a deformation of the separating wall 1. This causes damage to the negative-pressure tank, and may result in rupture of the separating wall 1. Accordingly, partitions not according to the invention must be thick-walled and heavy, or be provided with reinforcing means in order to avoid the deformations. This generally results in poor thermal insulation between the chambers, and an undesirable increased thermal mass of the tank.

FIGS. 3A and 3B show a negative-pressure tank according to the invention, before and after the evacuation. A negative-pressure tank, having two chambers 2 and a partition 1 having two walls 1.1, 1.2, and a connection 4 are illustrated before and after the evacuation. Before the evacuation, the chamber 2 has a pressure that is essentially identical to the pressure of the partition 1 and of the surroundings. After the evacuation, the pressure in the free space 3 and at the partition 1 is higher than in the chambers 2. The application of pressure has caused the partition 1 to deform, and the volume of the partition 1 and of the free space 3 is increased. Tests of the negative-pressure tank have provided very good results with regard to mechanical stability, even under high alternating pressure load (up to dp=100 mbar, for example). A positive effect with regard to the thermal insulation is also exhibited.

FIG. 4 shows a negative-pressure tank according to the prior art in a sorption machine. The partitions 1 in a sorption machine separate the various components of a sorption machine from one another. The sorption machine may have a desorber/adsorber unit 10, a condenser 6, and an evaporator 7, for example. The desorber/adsorber unit preferably has two chambers 2. When different pressures are present in the components (for example, $p_{desorber} \geq p_{condenser} >$ $p_{evaporator} \geq p_{adsorber}$), deformations 8 of the partitions 1 may result which may possibly lead to losses in functionality.

FIG. 5 shows a preferred negative-pressure tank in a sorption machine. The illustrated sorption machine has a design which is analogous to the sorption machine illustrated in FIG. 4. However, a preferred negative-pressure tank is integrated into the sorption machine, the partitions 1 having two walls 1.1, 1.2 which are joined to a connection 4, so that a free space 3 is present between the walls 1.1, 1.2. Within the meaning of the invention, the free space 3 may also be referred to as an air space. After a pressure is applied, a deformation of the partition 1 occurs and a stable structure is formed. The pressure in the partition 1 preferably corresponds to ambient pressure, and is therefore higher than the pressure that is present in the components (example: $p_{ambient} >> p_{desorber} \geq p_{condenser} > p_{evaporator} \geq p_{adsorber}$). The volume of the free space 3 or of the partition 1 may be increased due to the deformation. To allow mass transfer between the chambers 2 or other components of the sorption machine, vapor openings may be introduced into the partitions, so that, for example, a vapor may flow from one chamber 2 into the other. However, the vapor openings do not influence the improved functionality of the characteristic of the deformation of the partition 1.

The invention in particular solves the following technical problem:
- Achievement of high mechanical stability of the partition, in particular for the load under different pressures in the negative-pressure chambers, and for rapid alternating pressure loads, in order to prevent deformation, destruction, etc.
- Thermal insulation of the chambers from one another in order to prevent possible heat flow between the chambers
- Reduction of the thermal masses of the tank.

LIST OF REFERENCE NUMERALS

1 Partition
1.1 First wall
1.2 Second wall
2 Chamber
3 Free space
4 Connection
6 Condenser
7 Evaporator
8 Deformation
9 Side edges
10 Adsorber/desorber unit

The invention claimed is:

1. Sorption machine including a negative pressure tank, said tank comprising
at least one deformable partition that deforms under negative pressure, wherein
the partition comprises at least two walls, and
the negative-pressure tank comprises at least two chambers,
wherein
the partition separates the chambers, and the two walls of the partition are connected to one another at at least one point or at least one line, at least one free space being present between the at least two walls, wherein the free space has a pressure which corresponds to ambient pressure.

2. The sorption machine according to claim 1, wherein the partition has at least one lead-through for a flow between the chambers.

3. The sorption machine according to claim 1, wherein the walls of the partition are connected in an integrally joined and/or positive-fit manner.

4. The sorption machine according to claim 1, wherein a fluid is present in the free space.

5. The sorption machine according to claim 1, wherein the walls of the partition are made of sheet metal.

6. The sorption machine according to claim 1, wherein the walls have a thickness of less than 3 mm.

7. The sorption machine according to claim 6, wherein the walls have a thickness of less than 2 mm.

8. The sorption machine according to claim 6, wherein the walls have a thickness of less than 1 mm.

9. The sorption machine according to claim 1, wherein the negative-pressure tank comprises two chambers and at least one partition, and the chambers are an adsorber chamber and a desorber chamber.

10. The sorption machine according to claim 1, wherein one partition is integrated into the sorption machine.

11. The sorption machine according to claim 10, wherein two partitions are integrated into the sorption machine.

12. The sorption machine according to claim 10, wherein three partitions are integrated into the sorption machine.

13. The sorption machine according to claim 1, wherein the partition is deformed by application of a pressure.

14. The sorption machine according to claim 13, wherein the pressure is a said negative pressure.

15. Method for separating at least two chambers of a negative-pressure tank comprising:
providing the sorption machine of claim 1.

* * * * *